United States Patent [19]

Farr

[11] Patent Number: 4,566,275
[45] Date of Patent: Jan. 28, 1986

[54] HYDRAULIC BOOSTERS FOR VEHICLE BRAKING SYSTEMS

[75] Inventor: Glyn P. R. Farr, Leek Wooton, England

[73] Assignee: Lucas Industries Public Limited Company, Birmingham, England

[21] Appl. No.: 881,696

[22] Filed: Dec. 14, 1984

Related U.S. Application Data

[63] Continuation of Ser. No. 391,354, Jun. 23, 1982, abandoned.

[30] Foreign Application Priority Data

Jul. 4, 1981 [GB] United Kingdom ............... 8120750

[51] Int. Cl.$^4$ ............................................. B60T 13/20
[52] U.S. Cl. ................................ 60/554; 91/369 A; 91/376 R; 91/417 R
[58] Field of Search ............... 91/49, 369 A, 376 R, 91/417 R; 60/554, 547.1, 548, 552

[56] References Cited

U.S. PATENT DOCUMENTS

| 3,961,561 | 6/1976 | Knutson | 91/416 |
| 4,075,848 | 2/1978 | Ueda | 60/547.1 |
| 4,135,435 | 1/1979 | Adachi | 91/49 |
| 4,241,642 | 12/1980 | Peeples | 91/49 |
| 4,248,135 | 2/1981 | Peeples | 91/49 |
| 4,319,455 | 3/1982 | Schubert | 91/369 A |
| 4,404,803 | 9/1983 | Steffes | 60/547.1 |
| 4,417,445 | 11/1983 | Furuta | 60/554 |
| 4,433,543 | 2/1984 | Thomas | 60/547.1 |
| 4,490,977 | 1/1985 | Fulmer | 60/547.1 |

FOREIGN PATENT DOCUMENTS

| 10377 | 4/1980 | European Pat. Off. . |
| 2069079 | 8/1981 | United Kingdom . |

Primary Examiner—Abraham Hershkovitz
Attorney, Agent, or Firm—Scrivener Clarke Scrivener and Johnson

[57] ABSTRACT

An hydraulic booster has a boost piston which works in a bore and is subjected to boost pressure in a boost chamber to actuate a master cylinder assembly, and a control valve assembly controls pressurization of the boost chamber in response to an input load applied to a pedal-operated input member. The input member works in a bore in the boost piston and in operation, a reaction load from the master cylinder is fed back through the booster to the input member through a reducer mechanism to provide a reaction at the pedal which is not affected by the boost pressure, and the reducer mechanism is received within a recess in the boost piston, which is defined between two relatively movable parts of the boost piston.

12 Claims, 1 Drawing Figure

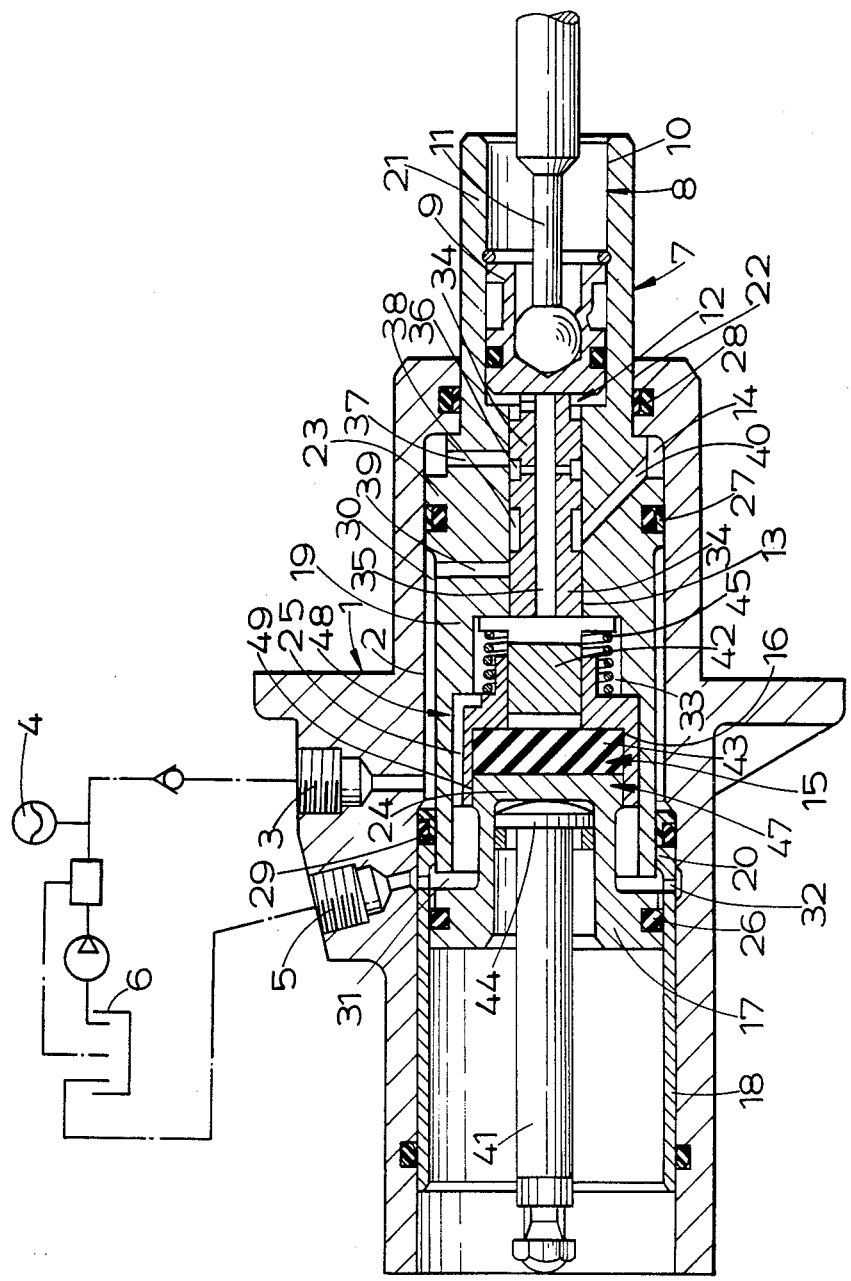

HYDRAULIC BOOSTERS FOR VEHICLE BRAKING SYSTEMS

This application is a continuation, of application Ser. No. 391,354, filed June 23, 1982, now abandoned.

This invention relates to an hydraulic booster for a vehicle braking system, the booster being of the kind comprising a housing provided with a bore, an inlet for connection to a source of high pressure hydraulic fluid and an outlet for connection to a reservoir for hydraulic fluid, and a boost piston for actuating a master cylinder assembly working in the bore, in operation the boost piston being advanced in the bore in response to pressurisation of a boost chamber by fluid from the source, pressurisation of the boost chamber being controlled by control valve means, operable to control the supply and exhaust of fluid, in response to an input load applied to a pedal-operated input member.

To facilitate installation in a limited space and also to conserve material cost and weight it is desirable to make a booster of the kind set forth as short as possible axially, and also to make, a combined booster and master cylinder assembly, as short as possible axially. In addition it is desirable for boosters of the kind set forth to be "output reactive", that is to say they should be so constructed that a reaction or "feel" at the pedal depends upon the load applied to the master cylinder assembly and is unaffected by the magnitude of the boost pressure acting on the boost piston.

According to our invention, in an hydraulic booster of the kind set forth the pedal-operated input member works in a bore in the boost piston, and in operation, a reaction load from the master cylinder assembly is fed back through the booster to the input member through a reducer mechanism to provide a reaction at the pedal which is substantially unaffected directly by the magnitude of the boost pressure, the boost piston comprising a two-part telescopic assembly, with a forward part through which the reaction is transmitted to the reducer mechanism, which is received within a recess disposed between the two relatively movable parts of the boost piston.

Arranging for the input member to work in a bore in the boost piston enables the boost piston to project from the outer end of the housing which makes the booster overhung. (A booster is said to be overhung when a substantial portion of the stroke length of the boost piston, or the input member, is located outside the housing). This has the advantage that less space in an axial direction is required since, the pedal stroke is limited by the boost piston or the input member, which move forward in operation, rather than by the housing. Also the total length of the booster is reduced by the further amount of the depth of the recess in the boost piston in which the reducer mechanism is received. Thus the booster is compact axially and the effective length of a combined booster and master cylinder assembly can be maintained at a minimum value by arranging for the master cylinder also to be "overhung" which is achieved by recessing it into the forward end of the housing of the booster.

Further, the booster is "output reactive" and the operator will be unaware of the magnitude of boost pressure and any variations in boost pressure due to seal hysteresis will not be felt at the pedal. Although the hysteresis of the booster may be high, the apparent hysteresis at the pedal will be relatively small.

The reducer mechanism is normally located between relatively movable parts, to enable the reaction to be transmitted consistently back to the pedal. Locating the reducer mechanism between relatively movable parts of the booster piston enables the construction and assembly of the booster to be simplified.

Preferably, the control valve means itself constitutes thrust transmitting means through which the reaction load from the master cylinder assembly is transmitted from the reducer mechanism to the input member without the provision of additional transmission means, separate from, and independent of, the control valve means.

The control valve means acts on the reducer mechanism through a thrust-transmitting member. The valve means may comprise a spool which works in the bore in the boost piston.

The reducer mechanism may comprise a deformable plug, for example of rubber.

The boost piston is of stepped outline, having at least two axially spaced portions of different diameters on the rearward part of the boost piston, of which the first, rearmost portion of smaller diameter works through a first seal in the housing and the second portion of greater diameter carries a rearward seal having a slidable sealing engagement with a complementary portion of the bore in the housing.

Preferably the boost piston has three axially spaced portions of at least two different diameters, with the third portion disposed on the forward part, which carries a forward seal having a slidable sealing engagement with a complementary portion of the bore in the housing.

Preferably, there are three chambers defined in the bore of the booster. The boost chamber is defined between the first seal in the housing and the rearward seal carried by the boost piston, a pressure chamber, to which the inlet is connected, is defined between a second seal in the housing and one of the seals carried by the piston, and an exhaust chamber, to which the outlet is connected, is defined between the second seal in the housing, and the other seal carried by the piston. Conveniently, the pressure chamber is disposed between the boost chamber and the exhaust chamber. Communication between the boost chamber and the pressure chamber, and between the boost chamber and the exhaust chamber is controlled by the control valve means. In an inoperative position the boost chamber is connected to the exhaust chamber, and when the booster is operated the pressure chamber is connected to the boost chamber.

Conveniently the three chambers are so constructed and arranged in the housing, between the bore and the boost piston, that in an inoperative position with the source of hydraulic fluid operative the fluid in the pressure chamber acts over a first region of the boost piston to subject it to a force urging it into a retracted position and in an operative position the high pressure fluid is admitted to the boost chamber and acts over a second region of the piston to subject it to a force urging it in an operative, brake-applying, direction.

At least one region may comprise a face on the piston at a change in diameter. Alternatively at least one region may be constituted by the difference in areas between oppositely arranged faces of different areas on the piston which are subjected to equal pressures.

An embodiment of our invention is illustrated in the accompanying drawing of which the single FIGURE shows a longitudinal section through an hydraulic booster for a vehicle hydraulic braking system.

The hydraulic booster illustrated in the FIGURE of the drawings comprises a housing 1 provided with a longitudinal stepped bore 2, an inlet 3 for connection to a source of high pressure fluid, suitably an accumulator 4, and an outlet 5 for connection to a reservoir for fluid 6. A boost piston 7 of stepped outline for operating a master cylinder assembly (not shown) works in the bore 2. The boost piston 7 is itself provided with a stepped bore 8 and comprises a two-part telescopic assembly having a forward part 47 and a rearward part 48. An input member in the form of a piston 9 works in the rearmost portion 10 of the bore 8, and is actuated by an input rod 11 connected to a pedal (not shown). A control valve means 12 also works in the bore 8, in a portion 13 of smaller diameter, and controls pressurisation of a boost chamber 14 defined in the bore 2. The control valve means 12 is operable in response to a load applied to the input piston 9. A reducer mechanism 15 is received in a recess 16 disposed between the relatively movable parts 47, 48 of the boost piston 7, and is operative to transmit a reaction load from the master cylinder to the pedal, to provide a reaction which is substantially unaffected by the magnitude of the boost pressure.

The forward part 47 of the boost piston 7 has a forward portion 17 of greater diameter working in a sleeve 18 which is sealingly retained in the open forward end of the housing to form part of the bore 2. The forward part 47 has a reduced diameter portion 24 which works in a bore 49 in the rear part 48. The rearward part 48 has an intermediate portion 19 of smaller diameter and of substantial length which works through a radial shoulder 20 at the inner end of the sleeve 18, a rear end portion 21 of substantially smaller diameter than the portion 19 which works through a portion 22 of the bore 2 at the rear end of the housing 1, and a portion 23 between the portions 19 and 21 and substantially of the same diameter as that of the portion 17 of greater diameter.

The portion 17 carries a forward seal 26 sealing with the sleeve 18, and the portion 23 carries a rearward seal 27 sealing with the bore 2. A first seal 28 is housed in the wall of the bore portion 22 for sealing engagement by the rear portion 10, and the shoulder 20 provides an abutment for a second seal 29 which is a composite seal, and provides a seal between the intermediate portion 19 and the sleeve 18, and also between the sleeve 18 and the bore 2.

The boost chamber 14 is defined in the bore 2 between the first seal 28 and the rearward seal 27 on the boost piston 3. A pressure chamber 30 is defined between the rearward seal 27 and the second seal 29, and is permanently connected to the inlet 3. The pressure in pressure chamber 30 acts on the face of the portion 23 to urge the boost piston 3 rearwardly. An exhaust chamber 31 is defined between the second seal 29 and the forward seal 26 and is permanently connected to the outlet 4 through a radial passage 32 in the sleeve 18. The exhaust chamber 31 also communicates with a chamber 33 formed in the bore 8 through slot 25 in the rearward part 48 of the boost piston 7.

Communication between the chambers is controlled by the valve means 12. The valve means 12 comprises a spool 34 which is operated through the input piston 9. The spool 34 has an axial passage 35 leading from the chamber 33 to the bore portion 10 at the forward end of the input piston 9. The diametral passage 36 in the spool 34 controls communication between the axial passage 35 and a radial passage 37 in the piston 7 which leads to the boost chamber 14. An annular recess 38 on the spool 34 controls communication between a radial passage 39 in the boost piston 7 leading to the pressure chamber 30, and an inclined passage 40 which leads to the boost chamber 14. At its forward end the spool 34 acts on an output member 41 through a thrust member 42, which slides in the bore in the rearward portion 48, the reducer mechanism 15, and the forward portion 47. The reducer mechanism comprises a rubber reaction block 43 which as shown is spaced from the forward end of the thrust member 42. The block 43 is of substantial diameter and abuts the rear face of the superimposed portion 24 which is of substantially equal area. An enlarged head 44 of the output member 41 abuts the opposite, forward face of the portion 24. A spring 45 acts between the piston 7 and the thrust member 42 to hold the spool 34 in the retracted position shown.

In the retracted position shown the exhaust chamber 31 is in communication with the boost chamber 14. The pressure in the pressure chamber 30 acts on the boost piston 7 to urge it into the retracted position.

When the pedal is operated to actuate the booster the spool 34 is advanced in its bore 13, initially to cut off communication between the passages 35 and 37 to isolate the boost chamber 14 from the exhaust chamber 31 and thereafter to place the pressure chamber 30 and the boost chamber 14 in communication via the recess 38. The high pressure fluid acts in the boost chamber 14 over an area equal to the difference in area between the portions 23 and 21, which is greater than the area of the opposing face of the adjacent end of the pressure chamber 30 over which the pressure also acts. This applies to the boost piston 7 a net force to urge it in a brake-applying direction, to operate the master cylinder with a thrust transmitted to the output member 41 from the forward part 47 through the reaction block 43.

The reaction of the load applied to the master cylinder acts in a reverse direction and is transmitted through the output member 41 and the part 47 to the block 43. This deforms the block 43 against the thrust member 42. Thus a reduction of the load applied to the master cylinder is fed back to the brake pedal through the thrust member 42 the valve spool 34, and the input piston 9 to provide a reaction or "feel" at the pedal.

When the reaction force on the control valve exceeds slightly the applied load from the pedal the spool 34 moves relatively rearwardly until communication between the pressure chamber 30 and the boost chamber 14 is cut-off. In this position the booster is in its null position with the three chambers 14, 30 and 31 isolated from each other.

If the input load is reduced the reaction block 43 urges the spool 34 rearwardly through a further distance. This re-establishes communication between the two chambers 31 and 14, allowing the pressure in the boost chamber 14 to reduce. When the input load is removed altogether the parts are returned to their retracted positions by the rearwardly-acting forces applied by the block 43, the pressure chamber 30 and the spring 45.

In the event of failure of the pressure source, after taking up a clearance, the thrust member 42 abuts the block 43 and, after a small displacement, the input load is transmitted through the forward part 47 to the output rod 41.

During operation of the booster the compression of the rubber block 43 transmits forces between the parts 47, 48, which causes relative movement of the parts. Normally rubber blocks are located between relatively movable members so that the reaction load is transmitted consistently back to the pedal. The location of the block 43 between the boost piston parts 47, 48 enables the construction and assembly of the booster to be simplified.

The booster is short axially with the boost piston 7 and the input piston 9 overhung as defined herein.

Further, in the booster, the chambers 14 and 31 which are normally connected to the reservoir are disposed at opposite ends of the pressure chamber 30. Any leakage past the seals at opposite ends of the pressure chamber 30 is therefore returned to the reservoir.

The booster described above may include an overhung hydraulic master cylinder of which the body is received within the inner end of the housings of the booster and the primary piston is operated by the engagement therewith of the output member 41.

I claim:

1. An hydraulic booster for a vehicle braking system comprising a housing provided with a bore, an inlet for connection to a source of high pressure hydraulic fluid and an outlet for connection to a reservoir for fluid, a pedal operated input member, an output member for applying an output force to a master cylinder assembly, a boost piston working in said bore, a boost chamber in said bore, said boost piston being advanced in said bore in response to pressurisation of said boost chamber by fluid from said source, said boost piston having forward and rearward relatively movable parts, said forward and rearward parts carrying seals each having slidable sealing engagement with a complementary portion of said housing bore, said rearward part of said boost piston having a forwardly extending portion of a diameter less than the portions of said bore complementary with said forward and rearward seals, a seal assembly fixed in said housing intermediate said forward and rearward seals and having slidable sealing engagement with the forwardly extending portion of the rearward part of said boost piston, a pressure chamber connected at all times with said inlet and defined between said intermediate and rearward seals and the forwardly extending portion of the rear part of said piston, an exhaust chamber connected with said outlet and defined between said forward and rearward piston parts and said forward and intermediate seals, the rearward part of said boost piston having a bore therein, a recess between the relatively movable parts of said boost piston, said input member working in said bore in the rearward part of said boost piston, a reducer mechanism located in said recess, and thrust transmission means which in operation feeds a reaction load from said master cylinder assembly back to said input member through said forward piston part and said reducer mechanism to provide a reaction which is substantially unaffected directly by the magnitude of the pressure in said boost chamber.

2. An hydraulic booster as claimed in claim 1 including control valve means operable to control communication between said boost chamber and said pressure chamber or said exhaust chamber to control pressurisation of said boost chamber in response to an input load applied to said input member, said control valve means itself constituting said thrust-transmitting means through which said reaction load from said master cylinder assembly is transmitted from said reducer mechanism to said input member without the provision of additional transmission means separate from, and independent of said control valve means.

3. An hydraulic booster as claimed in claim 2, wherein said control valve means includes a control valve member and a thrust-transmitting member interposed between said control valve member and said reducer mechanism.

4. An hydraulic booster as claimed in claim 2, wherein said control valve means comprises a spool working in a bore in the rearward part of said boost piston.

5. An hydraulic booster as claimed in claim 1, wherein said reducer mechanism comprises a deformable plug.

6. An hydraulic booster as claimed in claim 1, wherein the rearward part of said boost piston includes a rearmost portion of reduced diameter working through a first seal fixed in said housing said bore in which said input member works being in said rearmost portion.

7. An hydraulic booster as claimed in claim 6, wherein said boost chamber is defined between said first seal in said housing and the seal carried by said rearward part of said boost piston.

8. An hydraulic booster as claimed in claim 1, wherein said pressure chamber is disposed between said exhaust chamber and said boost chamber.

9. An hydraulic booster as claimed in claim 8, wherein said three chambers are so constructed and arranged in the housing between said bore and said boost piston, that with said source of hydraulic fluid operative, and said booster in an inoperative position, the fluid in said pressure chamber acts over a first region of said boost piston to subject it to a force urging it into a retracted position, and in an operative position the fluid is admitted to said boost chamber and acts over a second region of said boost piston to subject said boost piston to a force urging it in a brake-applying direction.

10. An hydraulic booster as claimed in claim 9, wherein at least one said region comprises a face on said boost piston at a chamber in diameter.

11. An hydraulic booster as claimed in claim 9, wherein at least one said region is constituted by the difference in areas between oppositely arranged faces of different areas on said boost piston which are subjected to substantially equal pressures.

12. The booster of claim 1 wherein said inlet and said outlet are disposed on said housing in close adjacency to each other on the respective opposite sides of said seal assembly which is fixed in said housing intermediate said forward and rearward seals.

* * * * *